(12) United States Patent
McKeigue et al.

(10) Patent No.: US 6,280,819 B1
(45) Date of Patent: Aug. 28, 2001

(54) STRUCTURED PACKING

(75) Inventors: Kevin McKeigue, Berkeley Heights, NJ (US); Ramachandran Krishnamurthy, Chestnut Ridge, NY (US); Hendrik Adriaan Kooijman, Tuebingen (DE)

(73) Assignee: The BOC Group, Inc., Murray Hill, NJ (US)

( * ) Notice: Subject to any disclaimer, the term of this patent is extended or adjusted under 35 U.S.C. 154(b) by 0 days.

(21) Appl. No.: 09/344,647

(22) Filed: Jun. 25, 1999

(51) Int. Cl.$^7$ ................................ B32B 3/10; B32B 3/28; B01D 47/00
(52) U.S. Cl. .................... 428/137; 428/184; 261/105; 261/112.2; 261/DIG. 72
(58) Field of Search ........................................ 428/137, 182, 428/184; 261/112.2, 100, 105, DIG. 72

(56) References Cited

U.S. PATENT DOCUMENTS

| 4,597,916 | * | 7/1986 | Chen | ................................ | 261/112.1 |
| 5,350,566 | | 9/1994 | Stingaro . | | |
| 5,474,832 | * | 12/1995 | Massey | ................................ | 428/182 |

FOREIGN PATENT DOCUMENTS 0 036 944A    10/1981   (EP) .

* cited by examiner

Primary Examiner—Donald J. Loney
(74) Attorney, Agent, or Firm—Wan Yee Cheung; Salvatore P. Pace

(57) ABSTRACT

The present invention provides a structured packing comprising a plurality of corrugated sheets and a plurality of flat, planar members alternating with and located between the sheets to inhibit turbulence in vapor ascending through the structured packing. The plurality of planar members are positioned so that at least lowermost transverse edges of the planar members and the corrugated sheets are situated at least proximal to one another as viewed when said structured packing is in use. Each of the planar members and the corrugated sheets has perforations sized to inhibit liquid and vapor flows but to allow pressure equalization. The planar members can be strip-like and positions at or near the top and bottom transverse edges of the corrugated sheets or can have the same length and width of the corrugated sheets. The size and number of perforations can be optimized for air separation applications.

13 Claims, 2 Drawing Sheets

STRUCTURED PACKING

BACKGROUND OF THE INVENTION

The present invention relates to a structured packing having particular application to a method of separating air in which the packing is formed of a plurality of corrugated sheets and a plurality of flat, planar members alternating with and located between the corrugated sheets to inhibit vapor turbulence. More particularly, the present invention relates to such a structured packing in which the corrugated sheets and the flat, planar members have perforations sized to inhibit vapor and liquid flows but to allow for pressure equalization through the packing.

Structured packing has found wide spread use in a variety of distillations including those involved in the separation of air into its component parts. Distillations are conducted within distillation columns filled with mass transfer elements to bring ascending vapor phases into intimate contact with descending liquid phases of mixtures to be separated. As the ascending phase rises and contacts the descending liquid phase, it becomes evermore enriched in the more volatile components of the mixture to be separated. At the same time the descending liquid phase becomes ever more concentrated in the less volatile components of the mixture to be separated. In such fashion, systems of distillation columns can be used to separate various mixture components. For instance, in case of air separation, nitrogen is separated from oxygen is a double distillation column unit. Argon is then separated from oxygen in an argon column that is attached to a lower pressure column of such double distillation column unit.

Structured packings are widely used as mass transfer elements within distillation columns due to their low pressure drop characteristics. Structured packings generally include corrugated sheets of material in which the sheets are placed in a side by side, relationship with the corrugations of adjacent sheets crisscross-crossing one another. In use, the liquid phase of the mixture to be separated is distributed to the top of the packing and spreads out throughout the packing as a descending film. The vapor phase of such mixture rises through the corrugations contacting the liquid film as it descends.

There have been many attempts in the prior art to increase the efficiency of structured packings, that is, to decrease the height of packing equal to a theoretical plate. Obviously, the lower the height, the more efficient the packing. At the same time, structured packing with a low HETP inherently has an increased pressure drop over less efficient packings. One such structured packing is disclosed in U.S. Pat. No. 4,597,916 in which the corrugated sheets are separated from one another by flat, perforated sheets that extend throughout the packing. It is thought by the inventors herein that the flat perforated sheets of this packing increase efficiency both by providing additional interfacial area for vapor-liquid contact and by increasing turbulence in the vapor flow and therefore the degree of mixing between vapor and liquid phases. Transverse mixing is also increased by perforations that are specifically designed to promote liquid and vapor flow in a transverse direction of the packing.

As will be discussed, Applicants have designed a structured packing that unlike the prior art, is optimized not for efficiency, but rather, for smooth vapor flow. Through such optimization, the Inventors herein have found that it is possible to increase the capacity of the packing and therefore, use such packing in a more efficient cost effective manner.

SUMMARY OF THE INVENTION

The present invention provides a structured packing comprising a plurality of corrugated sheets and a plurality of flat, planar members alternating with and located between the sheets to inhibit turbulence in vapor ascending through said structured packing. The plurality of planar members are positioned so that at least lowermost transverse edges of the planar members and the corrugated sheets are situated at least proximal to one another as viewed when the structured packing is in use. Each of the planar members and the corrugated sheets has perforations sized to inhibit liquid and vapor flows but to allow pressure equalization.

Pairs of the planar members can be located between the corrugated sheets and spaced apart from one another so that the uppermost and the lowermost transverse edges of the planar member and the corrugated sheets are aligned. Additionally, the planar members may sized with lengths and widths equal to those of the corrugated sheets.

In any embodiment, each of the perforations can have a diameter in a range of between about 5% and about 40% of a channel width of corrugations of the corrugated sheets as measured between adjacent peaks or troughs of the corrugations. This diameter can be between about 5% and about 20% of the channel width. Preferably the diameter is about 10% of the channel width of corrugations. Furthermore, the perforations can constitute an open area of the planar members in a range of between about 5% and about 20% of a total area of the planar members. Such open area of the planar members can be between about 7% and about 15% of the total area. Preferably, the open area of the planar members is about 10% of the total area.

It has been found by the inventors herein that a structured packing designed in the manner set forth above functions with a slightly higher HETP than structured packings of the prior art. This is surprising considering the fact that the packing with the intermediate planar members has a greater surface area than similar packing not incorporating such planar members. A further unexpected feature is that a packing of the present invention will flood at higher vapor rates. There are various criteria that are used to describe the flooding condition, for instance, excessive pressure drop. In all cases if HETP is plotted against F-Factor (where F-Factor is a product of the superficial vapor velocity and the square root of the vapor density) flooding is evidenced by a rapid rise of the slope of the curve. Such a rise in HETP is indicative of the vapor supporting the descending liquid thereby choking the column and disrupting the separation. This increase in the flooding point allows higher flow rates through the column and therefore for a given volume of packing, greater production. This allows for thinner columns using less packings or columns that can handle a greater throughput. The reason for such operation is that the planar member and opening design of the present invention acts to inhibit turbulence in the vapor flow ascending through the structured packing.

BRIEF DESCRIPTION OF THE DRAWINGS

While the specification concludes with claims distinctly pointing out the subject matter that Applicants regard as their invention, it is believed the invention would be better understood when taken in connection with the accompanying drawings in which:

DETAILED DESCRIPTION

Figure 1:
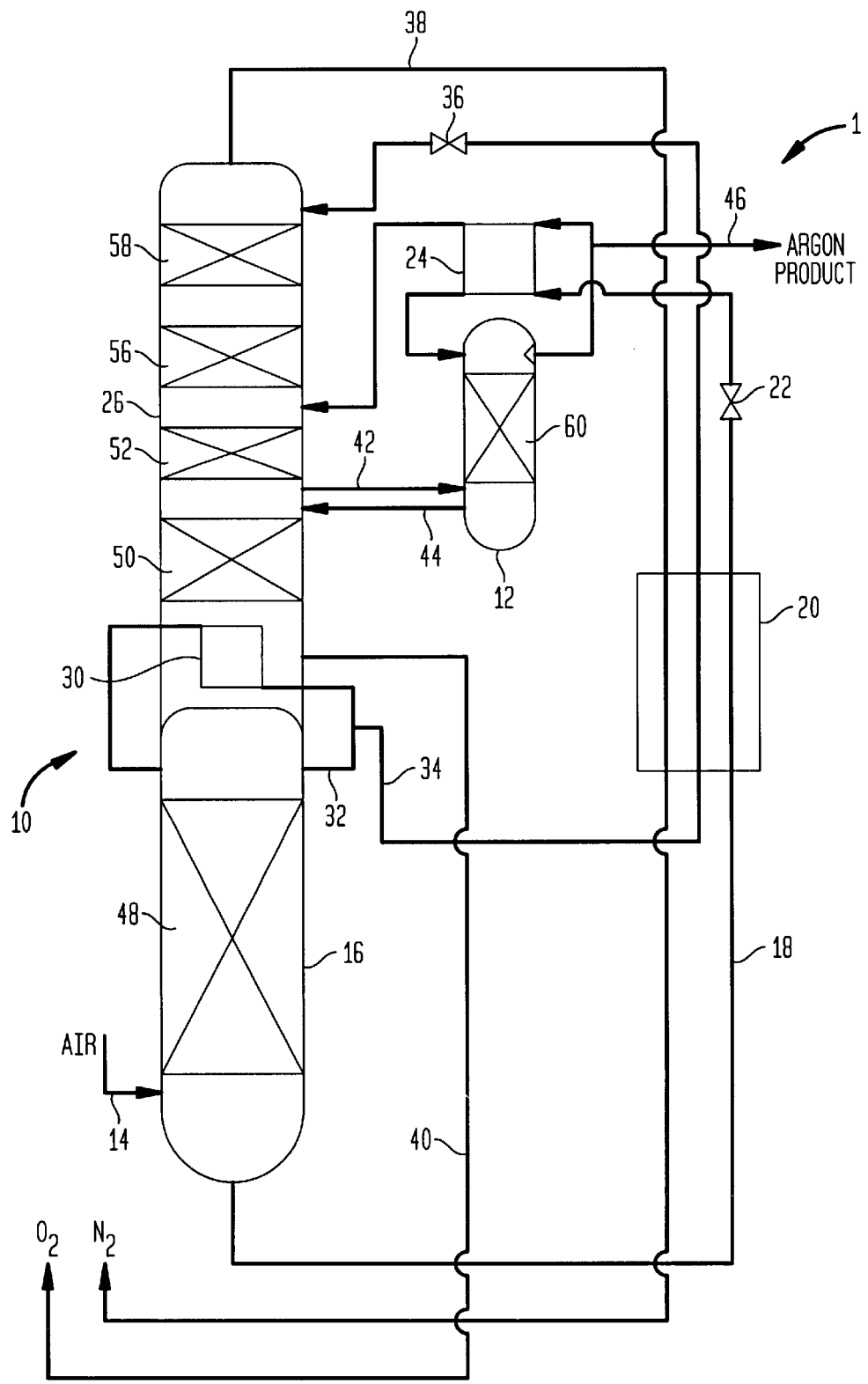
FIG. 1 is a schematic view of an air separation plant utilizing a structured packing in accordance with the present invention.

With reference to FIG. 1, an air separation plant 1 is illustrated. Air separation plant 1 has a double distillation column unit 10 and an argon column 12. Although not illustrated, but as would be known by those skilled in the art, air separation plant 1 would additionally have a main heat exchanger to cool the air to a rectification temperature against warming product streams to ambient temperatures. Additionally, a main air compressor and a pre-purification unit would also be provided to compress the air and then to purify the compressed air of impurities such as carbon dioxide and moisture.

Air as a feed stream 14 enters a higher pressure column 16 of double distillation column unit 10 where it is rectified to produce a nitrogen rich tower overhead and a crude liquid oxygen column bottoms. Stream 18 of the crude liquid oxygen column bottoms is subcooled within a subcooling unit 20 and then expanded across an expansion valve 22. The expansion reduces the temperature of stream 18 so that it can serve as coolant for a head condenser 24 used to form reflux for an argon column 12. The crude liquid oxygen obtained within stream 18 is vaporized within head condenser 24 and then fed into a lower pressure column 26 (of double distillation column unit 10) for further refinement. The further refinement produces an oxygen-enriched column bottoms and a nitrogen vapor tower overhead within the lower pressure column 26.

Reflux for both the higher and lower pressure columns 16 and 26 is provided by condensing the nitrogen-rich tower overhead within a condenser reboiler 30 to produce higher and lower pressure column reflux streams 32 and 34. Lower pressure reflux stream 34 is subcooled within subcooling unit 20 and reduced in pressure by expansion valve 36 prior to its introduction into lower pressure column 26. The nitrogen vapor tower overhead is-removed as a nitrogen stream 38 which serves in subcooling unit 20 to subcool stream 18 and lower pressure column reflux stream 34. An oxygen product stream 40 may be removed as a liquid from a bottom region of lower pressure column 26. Both the nitrogen stream 38 and the oxygen product stream 40 may be introduced into the main heat exchanger for cooling the incoming air.

At an intermediate location of lower pressure column 26, an argon rich vapor stream 42 may be removed and introduced into argon column 12. An argon rich tower overhead is produced within argon column 12. An oxygen rich column bottoms is also produced which is returned as a liquid stream 44 back to lower pressure column 26. An argon product stream 46 may be removed from part of the condensate of head condenser 24.

In order to effectuate the distillation, ascending vapor phases and descending liquid phases must be brought into contact with one another by mass transfer elements. For instance, higher pressure column 16 is provided with transfer elements 48 which may be trays or structured packings. As vapor rises within mass transfer elements 48, it becomes ever more rich in nitrogen until it reaches the top of higher pressure column 16. There, the vapor is condensed and in part returned as higher pressure column reflux stream 32 to higher pressure column 16. The nitrogen rich tower overhead, as a liquid, descends within higher pressure column 16 and becomes ever more richer in oxygen, through contact with the ascending vapor, to produce the crude liquid oxygen column bottoms.

Vapor rising within lower pressure column 26 passes through beds 50, 52, 56 and 58 which are formed of structured packing. The ascending vapor phase, initiated by boiling the oxygen rich liquid, rises through the column and becomes ever more rich in nitrogen to form the nitrogen vapor tower overhead. The descending liquid phase is initiated by the reflux of higher pressure column stream 34. This liquid becomes ever more rich in oxygen as it descends.

Argon column 12 is provided with a mass transfer elements 60 which again, are a structured packing. The vapor phase initiated by introduction of argon rich vapor stream 42 to becomes ever more rich in argon. The reflux introduced into the top of argon column 12 becomes ever more rich in oxygen as it descends.

Figure 2:
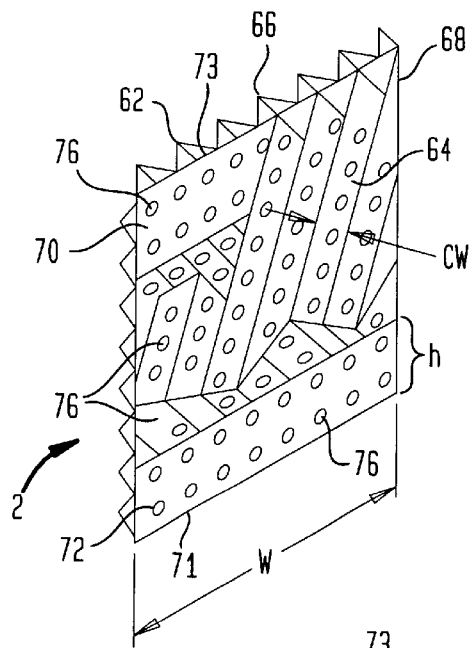
FIG. 2 is a fragmentary view of structured packing in accordance with the present invention for use in the air separation plant illustrated in FIG. 1.
Figure 3:
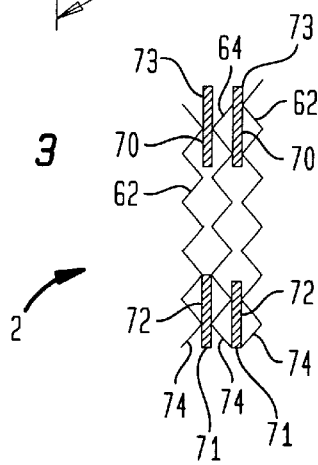
FIG. 3 is a fragmeentary, side elevational view of the structured packing shown in FIG. 2.

With reference to FIGS. 2 and 3, structured packing 2 in accordance with the present invention as illustrated. Structured packing 2 consists of repeating pairs of corrugated sheets 62 and 64 which contain corrugations 66 and 68, respectively. The repetition of corrugated sheets 62 and 64 produce either the top or lower half of a bed of packing. Corrugations 66 and 68 are inclined at an angle to the vertical, for instance 30 or 45°, or even greater in an appropriate application. Corrugated sheets 62 and 64 are positioned so that corrugations 66 and 68 criss cross one another.

Flat, planar members 70 and 72 alternate with and are positioned between corrugated sheets 62 and 64. Preferably, each of planar members 70 and 72 sized with a width "W" equal to the width of corrugated sheets 62 and 64 and a height "h" less than that of corrugated sheets 62 and 64. As illustrated, the lowermost transverse edges 71 are aligned with those of the corrugated sheets 62 and 64 and the uppermost transverse edges 73 are aligned with those of the corrugated sheets 62 and 64. It is understood however that there might be some misalignment in the nature of 5 mm and hence, such lowermost and uppermost transverse edges in any embodiment are situated at least near or proximal to those of corrugated sheets 62 and 64.

Although two planar members 72 and 70 are illustrated the present invention encompasses an embodiment in which upper planar members 70 are deleted. In such a possible embodiment, the remaining planar members 72 are positioned so that the lowermost transverse edges thereof are aligned with those of corrugated sheets 62 and 64 or at least proximally positioned thereto.

The foregoing structured packing may be optimized for use in any of the aforementioned columns of an air separation plant. If a channel width labeled in the drawing as "CW" is measured between the corrugations (from trough to trough or from peak to peak), then preferably, the height h of each of planar members 70 and 72 should be approximately between about 2 and about 8 times the channel width CW.

As illustrated, corrugated sheets 64 and 62 and planar members and 70 and 72 are provided with perforations 76. In any embodiment of a structured packing of the present invention, perforations 76 should be sized to prevent vapor and liquid and vapor flows but to permit pressure equalization through the structured packing. In case of air separation, each of the perforation 76 can be sized to have a diameter in a range of between about 5% and about 40% of channel width CW. This diameter is more preferably between about 10% and about 25% of the channel width CW and is most preferably about 15% of the channel width CW.

Figure 4:
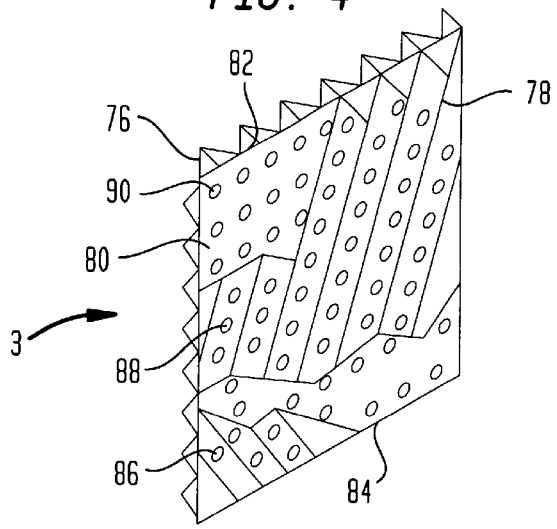
FIG. 4 is an alternative embodiment of a structured packing in accordance with the present invention.

A further optimization for air separation is to control the number of perforations 76 and therefore, their open area contribution. Preferably, perforations 76 can constitute an open area of the corrugated sheets 62 and 64 and the planar members 70 and 72 in a range of between about 5% and about 20% of a total area thereof. In case of corrugated sheets 62 and 64, such open area is computed by multiplying the length and width of each of corrugated sheets 62 and 64. More preferably such open area can be between about 7% and about 15% of the total area and most preferably, the open area is about 10% of the total area With additional reference to FIG. 4, structured packing 3 is of the type having repeating pairs of corrugated sheets 76 and 78 separated by or alternating with a flat, planar member 80 which has top and bottom edges 82 and 84 which are coincident with the top and bottom edges of corrugated sheets 76 and 78. Planar member 80 is sized with lengths and widths equal to those of corrugated sheets 76 and 78. Additionally, corrugated sheets 76 and 78 and planar members 80 are provided with perforations 86, 88 and 90. These perforations are again sized to prevent liquid and vapor flows and to permit pressure equalization. In such manner, smooth rather than turbulent vapor flows are promoted to produce the advantageous operation described above. Preferably, in case of air separation, the size and number of perforations 86, 88, and 90 are optimized in the same manner as described above for structured packing 2.

Structured packing 2 and 3 where tested against structured packing obtained from Sulzer Chemtech Ltd, Winterthur, Switzerland, as model Mellapak 500.YL. This packing has a density of about 500 m²/m³. The structured packing 2 and 3 was than fabricated out of corrugated sheets that would otherwise have had the same density but for planar members 70, 72, and 80, respectively, and therefore were of slightly greater density. A greater separation efficiency was therefore to have been expected.

Testing, however, showed that with the type of mixtures to be separated in an air separation plant, either in a lower pressure column, such as lower pressure column 26, or in an argon column, such as argon column 12, at operational ranges of F-Factor prior to flooding, structured packing 2 had an HETP of about 15% greater than the Mellapak 500.YL packing. Structured packing 3 (more dense than structured packing 2) had an HETP of about 25% greater than the Mellapak 500.YL packing. Moreover the flooding points of structured packings 2 and 3 where about 25% and about 40% greater than the Mellapak 500.YL packing.

While the present invention has been described with reference to a preferred embodiment, as will occur to those skilled in the art, numerous changes, additions and omissions may be made without departing from the spirit and scope of the present invention.

We claim:

1. A structured packing comprising:
   a plurality of rectangular, corrugated sheets; and
   a plurality of flat, planar members alternating with and located between the sheets to inhibit turbulence in vapor ascending through said structured packing;
   said plurality of planar members positioned so that at least lowermost transverse edges of said planar members and said corrugated sheets are situated at least proximal to one another as viewed when said structured packing is in use;
   each of the planar members and said corrugated sheets having perforations sized to inhibit liquid and vapor flows but to allow pressure equalization.

2. The structured packing of claim 1, wherein pairs of said planar members are located between said corrugated sheets and spaced apart from one another so that the uppermost and the lowermost transverse edges of said planar member and said corrugated sheets are aligned.

3. The structured packing of claim 1, wherein said planar members have lengths and widths equal to those of said corrugated sheets.

4. The structured packing of claim 1 or claim 2 or claim 3, wherein each of said perforations have a diameter in a range of between about 5% and about 40% of a channel width of corrugations of said corrugated sheets as measured between adjacent peaks or troughs of said corrugations.

5. The structured packing of claim 4, wherein said diameter is between about 10% and about 25% of said channel width.

6. The structured packing of claim 5, wherein said diameter is about 15% of said channel width of corrugations.

7. The structured packing of claim 1 or claim 2 or claim 3, wherein said perforations constitute an open area of said planar members in a range of between about 5% and about 20% of a total area of said planar members.

8. The structured packing of claim 7, wherein said open area of said planar members is between about 7% and about 15% of said total area.

9. The structured packing of claim 8, wherein said open area of said planar members is about 10% of said total area.

10. The structured packing of claim 4, wherein said perforations constitute an open area of said planar members in a range of between about 5% and about 20% of a total area of said planar members.

11. The structured packing of claim 10, wherein said open area of said planar members is between about 7% and about 15% of said total area.

12. The structured packing of claim 11 wherein said open area of said planar members is about 10% of said total area.

13. The structured packing of claim 1, wherein each of said plurality of flat, planar members has a height between about 2 times and about 8 times a channel width of corrugations of said corrugated sheets as measured between adjacent peaks or troughs of said corrugations.

* * * * *